United States Patent
Tanaka et al.

(10) Patent No.: US 8,334,760 B2
(45) Date of Patent: Dec. 18, 2012

(54) ANTITHEFT DEVICE, ELECTRONIC CONTROL UNIT, ANTITHEFT SECURITY SYSTEM, AND ANTITHEFT METHOD

(75) Inventors: Masahiro Tanaka, Toyota (JP); Takeo Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 381 days.

(21) Appl. No.: 12/669,723

(22) PCT Filed: Jul. 16, 2008

(86) PCT No.: PCT/IB2008/002244
§ 371 (c)(1),
(2), (4) Date: Jan. 19, 2010

(87) PCT Pub. No.: WO2009/010872
PCT Pub. Date: Jan. 22, 2009

(65) Prior Publication Data
US 2010/0188199 A1    Jul. 29, 2010

(30) Foreign Application Priority Data
Jul. 18, 2007 (JP) .................................. 2007-187437

(51) Int. Cl.
B60R 25/10 (2006.01)
(52) U.S. Cl. ........... 340/426.1; 340/426.11; 340/426.13; 340/426.15; 340/428
(58) Field of Classification Search ............... 340/426.1, 340/426.3, 426.15, 426.13, 426.11, 428
See application file for complete search history.

(56) References Cited

U.S. PATENT DOCUMENTS

| 4,665,379 | A  | * | 5/1987 | Howell et al. | 340/426.21 |
| 6,639,511 | B2 | * | 10/2003 | Haruna et al. | 340/426.13 |
| 2002/0003472 | A1 | | 1/2002 | Haruna et al. | |

FOREIGN PATENT DOCUMENTS

| JP | 55-116182 | 9/1980 |
| JP | 10 11669 | 1/1998 |
| JP | 10-178701 | 6/1998 |
| JP | 2002-53011 | 2/2002 |
| JP | 2002 79911 | 3/2002 |
| JP | 2002-219926 | 8/2002 |
| JP | 2006-57583 | 3/2006 |
| JP | 2007 112211 | 5/2007 |

OTHER PUBLICATIONS

Office Action issued May 26, 2009, in Japanese Patent Application No. 2007-187437 filed Jul. 18, 2007 (with English language Translation).

* cited by examiner

Primary Examiner — Daniel Wu
Assistant Examiner — Mancil Littlejohn
(74) Attorney, Agent, or Firm — Oblon, Spivak, McClelland, Maier & Neustadt, L.L.P.

(57) ABSTRACT

An antitheft device that activates in connection with tampering with a vehicle, includes an air-conditioning unit operation determining portion that determines whether an air-conditioning unit is about to be operated or is operating, and a restricting portion that performs control to prohibit or restrict activation of the antitheft device when it is determined by the air-conditioning unit operation determining portion that the air-conditioning unit is about to be operated or is operating.

16 Claims, 9 Drawing Sheets

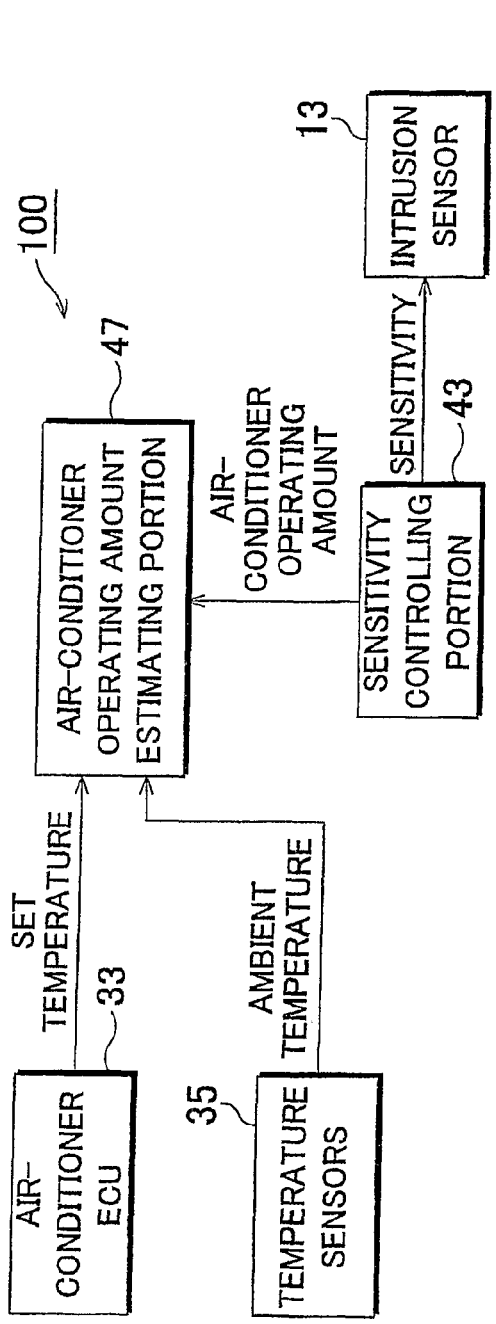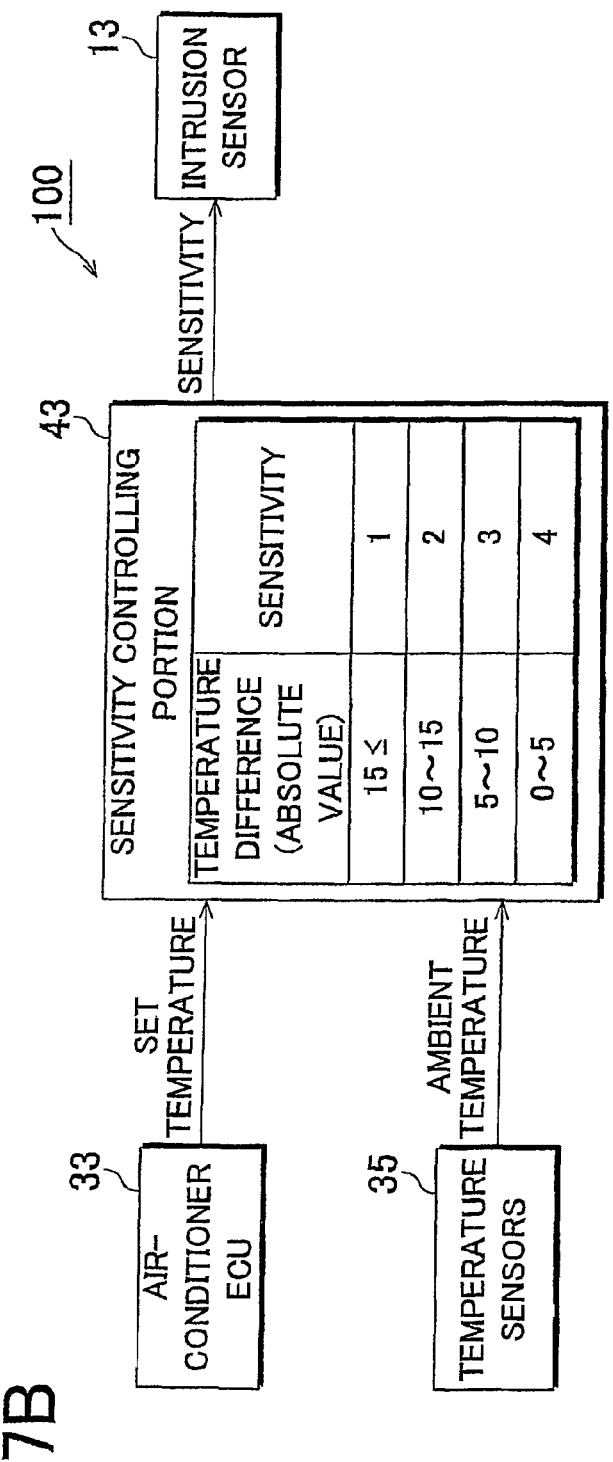
F I G . 7A
F I G . 7B

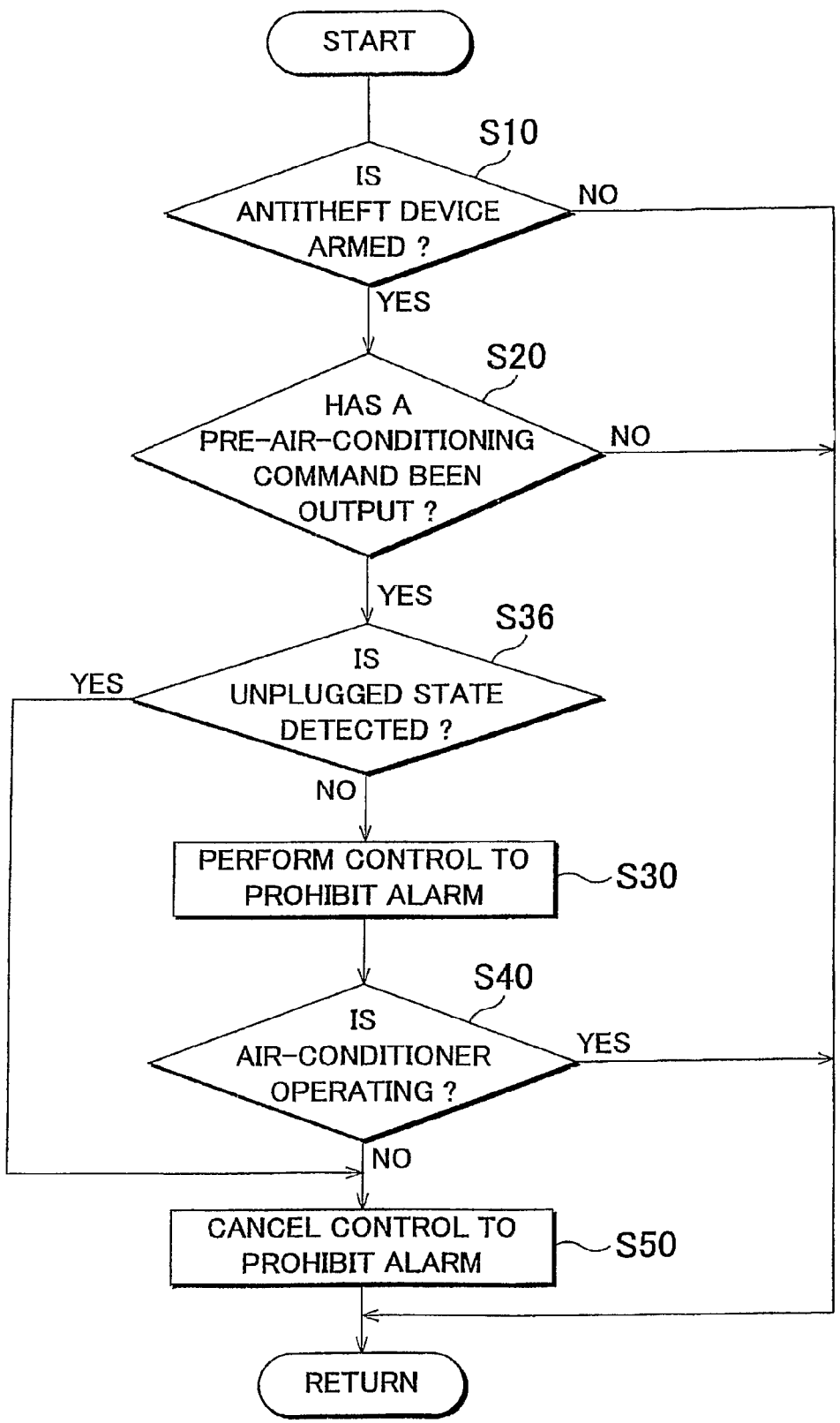

ANTITHEFT DEVICE, ELECTRONIC CONTROL UNIT, ANTITHEFT SECURITY SYSTEM, AND ANTITHEFT METHOD

FIELD OF THE INVENTION

The invention relates to an antitheft device and the like that activates when tampering with a vehicle is detected. More particularly, the invention relates to an antitheft device, an electronic control unit, an antitheft security system, and an antitheft method for reducing erroneous activation caused by operation of an onboard device.

BACKGROUND OF THE INVENTION

An antitheft device is mounted in a vehicle to prevent theft of articles in the vehicle cabin, as well as of the vehicle itself, when the vehicle is parked. The antitheft device detects when a door is unlocked (i.e., when the door lock is in the unlocked position) by any means other than the use of a legitimate key, or when a door or hood is opened (i.e., when a courtesy switch is on).

Also, when an individual that is up to no good (hereinafter simply referred to as a "suspicious individual") attempts to enter the vehicle by breaking a glass window, vibration or sound from the glass breaking during entry is detected by a sensor, for example. Also, when someone who has illicitly entered (i.e., broken into) the vehicle (hereinafter simply referred to as "an intruder") is in the vehicle, a moving body (i.e., the intruder) in the vehicle cabin is detected based on a disturbance in ultrasonic waves or radio waves received by an ultrasonic wave or radio wave transceiver fixed to the rearview mirror or the like. Also, to prevent the vehicle itself from being stolen by being moved by a tow truck or the like, an inclination sensor, which detects the inclination of the vehicle, detects the inclination of the vehicle when one end of the vehicle is raised.

Moreover, in addition to detecting straightforward tampering such as that described above, some antitheft devices also detect when a battery is disconnected and then reconnected again as tampering. This is because it is theoretically possible for one person to disconnect the battery, which would deactivate the antitheft device, and another person to break into the vehicle while the antitheft device is deactivated, and then have the person reconnect the battery.

If such tampering is detected, the antitheft device activates to deter theft, e.g., sounds the horn and blinks the hazard lights to scare off suspicious individuals near the vehicle, and takes a picture of the them and transmits the image data to the owner of the vehicle.

Some vehicles are equipped with a remote operating apparatus that enables the user of the vehicle to operate an onboard device from a distance via a terminal. For example, the user is able to send a signal to the remote operating apparatus from a terminal shortly before getting into the vehicle (before he or she is approaches the vehicle) to start the engine to warm it up beforehand, or turn on the air-conditioner so that the vehicle is a comfortable temperature when he or she gets in.

However, because a parked vehicle is in a state ready to detect tampering, activating such a remote operating apparatus may cause the following problems. For example, the antitheft device may erroneously activate as a result of falsely detecting vibrations of the vehicle caused by the engine starting as vibrations caused by tampering by a suspicious individual. Or, the reflected ultrasonic waves or radio waves may be disrupted by electromagnetic waves or blowing air produced by the air-conditioner when it is turned on, and the antitheft device may erroneously activate as a result of falsely detecting that disruption as a disruption caused by an intruder.

Also, when the engine or the air-conditioner is turned on by the remote operating apparatus, the battery voltage drops due to cranking and then rises again when the engine speed stabilizes. This drop and rise in voltage may be mistaken for the battery being disconnected and then reconnected again, which would cause the antitheft device to erroneously activate.

Regarding this, Japanese Patent Application Publication No. 2002-79911 (JP-A-2002-79911) describes technology that reduces such erroneous activation of an antitheft device that is caused by such remote operation. When an engine is started remotely, the technology described in JP-A-2002-79911 stores the engine startup state indicative of the fact that the engine has been started, and reduces the sensitivity of a tampering detection sensor. Storing the engine startup state makes it possible to prevent battery disconnection and reconnection from being falsely detected when the battery voltage temporarily drops due to cranking. Also, reducing the sensitivity of the detection sensor makes it possible to prevent vibrations caused by starting the engine or air blown from the air-conditioner when it is turned on from being falsely detected as an intruder.

However, with the technology described in JP-A-2002-79911, when the air-conditioner is turned on remotely without starting the engine, the engine startup state is unable to be stored so the air blown from the air-conditioner when the air-conditioner is turned on may end up being falsely detected as an intruder.

DISCLOSURE OF THE INVENTION

This invention thus provides an antitheft device, an electronic control unit, an antitheft security system, and an antitheft method, which minimizes erroneous activation when an air-conditioner of a parked vehicle is turned on.

A first aspect of the invention relates to an antitheft device for a vehicle. This antitheft device includes i) an antitheft portion that activates in connection with tampering with the vehicle, ii) an air-conditioning unit operation determining portion (such as a determining portion 42 and a pre-air-conditioning flag 45) that determines whether an air-conditioning unit is about to be operated or is operating, and iii) a restricting portion (such as a transition prohibiting portion 44 and a sensitivity controlling portion 43) which, when it is determined by the air-conditioning unit operation determining portion that the air-conditioning unit is about to be operated or is operating, performs control to prohibit or restrict activation of the antitheft device.

Further, the above-described antitheft device may further have a tampering detection portion that detects tampering, and the restricting portion variably may set the sensitivity of the tampering detection portion based on the operating amount of the air-conditioning unit.

Further, the above-described antitheft device may be such that the restricting portion reduces the sensitivity of a function of the tampering detection portion, which may make a false detection due to operation of the air-conditioning unit.

Further, the above-described antitheft device may further have a temperature detecting portion that detects the ambient temperature in the vehicle, and the restricting portion may perform control to prohibit or restrict activation of the antitheft portion according to the ambient temperature detected by the temperature detecting portion.

Further, the above-described antitheft device may be such that the ambient temperature is the temperature inside a cabin of the vehicle, which is detected by the temperature detecting portion.

Further, the above-described antitheft device may be such that the operating amount of the air-conditioning unit is estimated based on a difference between the ambient temperature and a predetermined temperature.

Further, the above-described antitheft device may further have a tampering detection portion that detects tampering; and a temperature detecting portion that detects the ambient temperature in the vehicle, and the restricting portion variably may set the sensitivity of the tampering detection portion based on the ambient temperature detected by the ambient temperature detecting portion.

Further, the above-described antitheft device may further have an unplugged state detecting portion that detects when a plug used for charging is unplugged, and when the unplugged state detecting portion may detect that the plug is unplugged, the control to prohibit or restrict activation of the antitheft portion by the restricting portion is canceled.

Further, the above-described antitheft device may be such that the air-conditioning unit operation determining portion may determine that the air-conditioning unit is about to be operated, between when an operation command is output to the air-conditioning unit and when the air-conditioning unit starts operating.

Further, the above-described antitheft device may be such that the operation command to the air-conditioning unit may be output by a remote operating device provided in the vehicle.

Further, the above-described antitheft device may be such that when all of the doors of the vehicle may be unlocked, the restricting portion performs the control to prohibit or restrict activation of the antitheft portion.

Further, the above-described antitheft device may be such that when a power source of the vehicle may be stopped, the restricting portion performs the control to prohibit or restrict activation of the antitheft portion.

Further, the above-described antitheft device may be such that the restricting portion may perform the control to prohibit or restrict activation of the antitheft portion when the operating amount of the air-conditioning unit is equal to or greater than a predetermined amount.

By performing control to prohibit or restrict activation when the air-conditioning unit is about to be operated or is operating, this antitheft device makes it possible to minimize erroneous activation due to operation of the air-conditioning unit.

A second aspect of the invention relates to an electronic control unit. The electronic control unit includes a tampering detection portion that detects tampering with a vehicle; an alarm device that activates according to the detection results of the tampering detection portion; an air-conditioning unit operation determining portion that determines whether an air-conditioning unit mounted in the vehicle is receiving an operation command or is operating; and a restricting portion that performs control to prohibit or restrict activation of the alarm device when it is determined by the air-conditioning unit operation determining portion that the air-conditioning unit is receiving an operation command or is operating.

A third aspect of the invention relates to an antitheft security system for a vehicle. The antitheft security, system includes a tampering detection portion that detects tampering with a vehicle; a remote operating apparatus that remotely operates an air-conditioning unit mounted in the vehicle; an air-conditioning unit operation determining portion that determines whether the air-conditioning unit is receiving an operation command or is operating; and a restricting portion that performs control to prohibit or restrict activation of the antitheft security system when it is determined by the air-conditioning unit operation determining portion that the air-conditioning unit is receiving an operation command or is operating.

A fourth aspect of the invention relates to an antitheft method for a vehicle using an antitheft device of a vehicle provided with an air-conditioning unit. The method includes detecting tampering with the vehicle; determining whether the air-conditioning unit is receiving an operation command or is operating; and prohibiting or restricting activation of the antitheft device when it is determined that the air-conditioning unit is receiving an operation command or is operating.

Accordingly, the invention makes it possible to provide an antitheft device, an electronic control unit, an antitheft security system, and an antitheft method, which minimizes erroneous activation when an air-conditioner of a parked vehicle is operated.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 7A and 7B are examples of block diagrams of an antitheft device that controls the sensitivity of an intrusion sensor based on the ambient temperature;

FIG. 10 is a flowchart illustrating a control routine of the antitheft device that detects the unplugged state.

DETAILED DESCRIPTION. OF THE EMBODIMENTS

A first example embodiment of the invention will now be described with reference to the appended drawings. An antitheft device 50 is used when guarding against tampering of a vehicle in which an air-conditioner is started remotely from a terminal 70 to provide a suitable cabin environment when a person gets into the vehicle. Restricting activation of the antitheft device 50 when the air-conditioner is turned on (i.e., is about to be operated) or is operating prevents the antitheft device from erroneously activating due to a fluctuation in power that occurs, or the blowing air that is produced, when the air-conditioner is turned on. In this example embodiment, the phrase "when the air-conditioner is about to be operated" may refer to the period between when an operation command is output to the air-conditioning unit (hereinafter this command will simply be referred to as an "operation command") and when the air-conditioning unit starts operating, for example.

Figure 1:
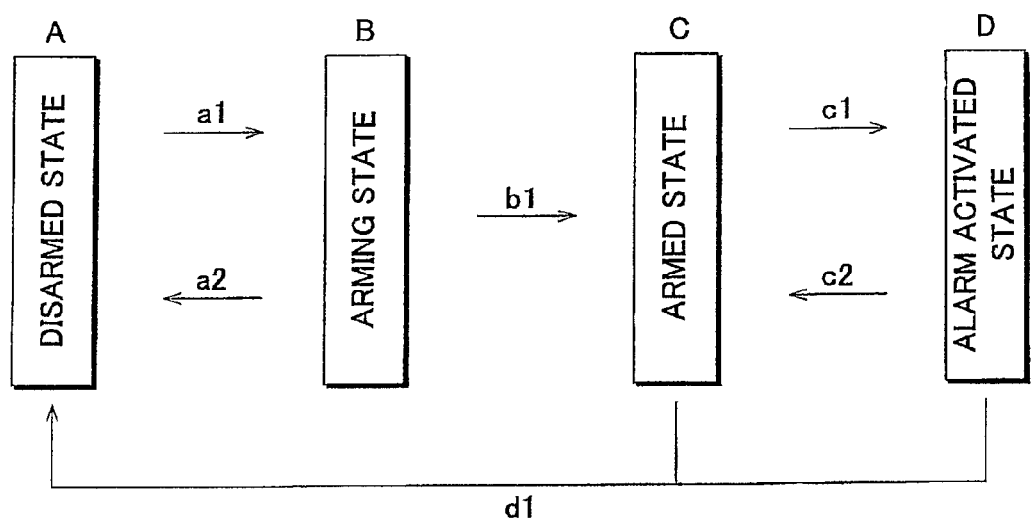
FIG. 1 is an example of a transition diagram showing the security states of an antitheft device.

First, the security states of the antitheft device 50 will be described. FIG. 1 shows an example of a transition diagram of the security states of the antitheft device 50. The security state of the antitheft device 50 shifts among various states, e.g., a disarmed state A, an arming state B, an armed state C, and an alarm activated state D according to predetermined transition conditions.

The disarmed state A is a state in which the device is not armed when it is determined (by the door being unlocked or open, or the ignition being on, for example) that the user is near or inside the vehicle. When a transition conditional is satisfied (e.g., when all of the doors are closed, such as when all of the doors are locked by a wireless key), the security state shifts from the disarmed state A to the arming state B.

The arming state B is a transitional state in which it is determined that the user is preparing to leave the vehicle. During this time, various sensors for detecting tampering are initialized in preparation to shift to the armed state C. When a transition condition b1 is satisfied (e.g., when a predetermined period of time has passed), the security state shifts from the arming state B to the armed state C. Also, when a transition condition a2 is satisfied (e.g., when a door is unlocked or opened, or the ignition is turned on), the security state shifts to the disarmed state A.

The armed state C is a state in which it is determined that the user is away from the vehicle and tampering is detected by various sensors. In the armed state C, the power source is stopped. That is, in a vehicle in which an engine is the only power source, the engine is stopped because the ignition key or the start switch is OFF. In a hybrid vehicle which uses both an engine and a motor as power sources, both the engine and the motor are stopped. In an electric vehicle in which a motor is the only power source, the motor is stopped.

When a transition condition c1 is satisfied (e.g., when a door is unlocked without using a wireless key, a door or the hood is opened, or the battery is disconnected and then reconnected), the security state shifts from the armed state C to the alarm activated state D. Also, when a transition condition d1 is satisfied (e.g., when a door is unlocked by a wireless key), the security state shifts to the disarmed state A. That is, if the transition condition d1 is satisfied when the power source of the vehicle is stopped (i.e., not on) in the armed state C, erroneous activation of the antitheft device 50 can be appropriately prevented.

The alarm activated state D is a state in which various sensors estimate that there is a possibility of auto-theft so an attempt is made to scare off suspicious individuals in or around the vehicle by sounding an alarm and flashing the hazard lights and the like. When a transition condition c2 is satisfied (e.g., when the alarm period exceeds a predetermined period of time), the security state shifts from the alarm activated state D to the armed state C. Also, when a transition condition d1 is satisfied (e.g., when a door is unlocked by a wireless key), the security state shifts to the disarmed state A.

Even in the armed state C, when the air-conditioner is turned on remotely (hereinafter referred to as pre-air-conditioning), erroneous activation of the antitheft device 50 is minimized by either prohibiting a shift into the alarm activated state D or reducing the sensitivity of an intrusion sensor 13. Incidentally, the description using the state transition diagram is only an example. The antitheft device 50 of this example embodiment is not limited as long as it can minimize erroneous activation of an alarm device 16 due to a false detection by the intrusion sensor 13.

Figure 2:
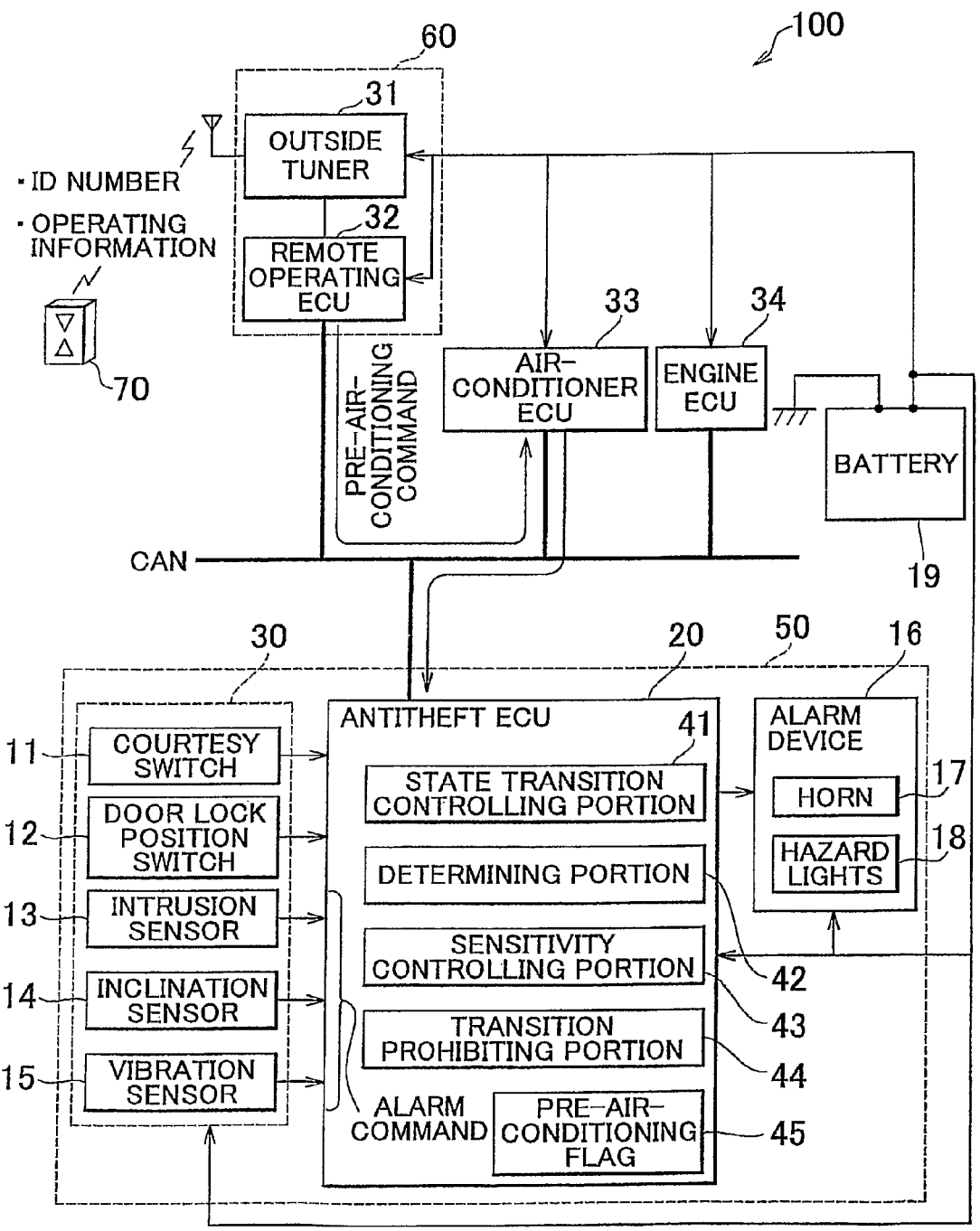
FIG. 2 is an example of a block diagram of an antitheft security system in which an air-conditioner is operated remotely.

FIG. 2 is a block diagram of an antitheft security system 100 in which the air-conditioner is turned on remotely. The antitheft security system 100 is structured such that the antitheft device 50, a remote operating apparatus 60, an air-conditioner ECU (Electronic Control Unit) 33, and an engine ECU 34 are connected together via a CAN (Controller Area Network).

The antitheft device 50 is controlled by an antitheft ECU 20 which is connected to various tampering detection sensors 30 that detect when the vehicle is being tampered with, such as when it is being vandalized or stolen. These sensors 30 include a courtesy switch, 11, a door lock position switch 12, the intrusion sensor 13, an inclination sensor 14, and a vibration sensor 15. The courtesy switch 11 is a switch that detects when the front and rear doors of the vehicle are opened and closed, when the trunk is opened and closed, and when the engine hood is opened and closed, and outputs a signal indicative of the opening and closing of the doors and the like to the antitheft ECU 20. The door lock position switch 12 is a switch that is provided on each front and rear door of the vehicle, which detects the position, i.e., a locked position or an unlocked position, of a door lock knob that changes positions when it the door is locked/unlocked, and outputs a signal indicative of the locked/unlocked state to the antitheft ECU 20.

The intrusion sensor 13 detects whether a suspicious individual has entered the vehicle cabin by transmitting ultrasonic waves and receiving the reflected waves. This intrusion sensor 13 is arranged facing the rear of the vehicle on the rearview mirror inside the vehicle, for example. When the difference between the frequency of the transmitted, wave and the frequency of the received wave exceeds a reference value, the intrusion sensor 13 determines that there is an intruder and outputs an alarm command to the antitheft ECU 20. Incidentally, the intrusion sensor 13 may also detect an intruder using radio waves instead of, or in combination with, ultrasonic waves.

The inclination sensor 14 is structured as a capacitive semiconductor sensor formed by micromachining, for example. When a change in the capacity due to the vehicle being inclined exceeds a reference value, the inclination sensor 14 determines that the vehicle is inclined possibly in an attempt to forcibly move it, and outputs an alarm command to the antitheft ECU 20.

The vibration sensor 15 is a vehicle height sensor that detects the amount of expansion and contraction of an absorber, for example. When an amount of change in the vehicle height of the overall vehicle body or a portion of the vehicle exceeds a reference value, the vibration sensor 15 determines that there is an intruder and outputs an alarm command to the antitheft ECU 20.

Incidentally, the intrusion sensor 13, the inclination sensor 14, and the vibration sensor 15 are all computers provided with a CPU, ROM, RAM, and an input/output portion. The antitheft ECU 20 is able to control the sensitivity of these sensors. For example, the antitheft ECU 20 can decrease the reference value for making the determination in each sensor (as is the case when increasing the sensitivity), or increase the reference value for making the determination in each sensor (as is the case when reducing the sensitivity).

Instead of the intrusion sensor 13, the inclination sensor 14, and the vibration sensor 15 each making determinations based on their respective detection signals and outputting an alarm command to the antitheft ECU 20, they may output their detection signals to the antitheft ECU 20 and the antitheft ECU 20 may determine whether there is an intruder or whether there is an attempt to move the vehicle based on the detection signals. In this case, the antitheft ECU 20 decreases or increases the reference value for making the determination in each sensor. Incidentally, in this example embodiment, each sensor has only one function, but a sensor or sensors with multiple functions may also be used.

The alarm device 16 scares off suspicious individuals by issuing an alarm to alert people around the vehicle that the vehicle is being tampered with. When any one of the tampering detection sensors 30 detects tampering, the antitheft ECU 20 controls the alarm device 16 to honk a horn 17 and flash hazard lights 18. Incidentally, the alarm device 16 may also be provided with a separate siren device. While the alarm device 16 is activated using power supplied from a battery 19, the siren device uses power from a separate battery mounted in the vehicle and sounds a siren when it detects that the battery 19 has been disconnected. As a result, the antitheft device 50 can scare away suspicious individuals even when the antitheft ECU 20 is unable to control the alarm device 16 to issue an alarm due to the battery 19 being disconnected.

The antitheft ECU 20 is a computer in which a CPU that executes programs, RAM which is a work area for executing the programs and in which data is temporarily stored, ROM in which a boot program and BIOS are stored; non-volatile memory in which programs and files are stored, and an input/output portion that sends and receives data, are all connected via an internal bus.

A state transition controlling portion 41 that controls the transition of the security state of the antitheft device 50, a determining portion 42 that determines whether a pre-air-conditioning flag 45 is on or off, a sensitivity controlling portion 43 that increases or decreases the sensitivity of the intrusion sensor 13 from among the tampering detection sensors 30, and a transition prohibiting portion 44 that prohibits a transition to the alarm activation state are each realized by the CPU executing programs. Also, the pre-air-conditioning flag 45, which turns on when a pre-air-conditioning command is output or when the air-conditioner is operating according to pre-air-conditioning, is stored in the RAM or the non-volatile memory of the antitheft ECU 20.

The remote operating apparatus 60 has an outside tuner 31 and a remote operation ECU 32. The outside tuner 31 demodulates the radio waves transmitted from the terminal 70 held by the user of the vehicle, extracts the ID number of the terminal 70 and information regarding the operation by the user (i.e., operating information), and outputs a signal indicative thereof to the remote operating ECU 32. The remote operating ECU 32 then authenticates the terminal 70 by determining whether the ID number matches an ID number that is stored in advance. If the ID numbers match, communication data according to the operating information is sent via CAN communication to another onboard device. For example, if the user of the vehicle starts the air-conditioner before getting into the vehicle, the remote operating ECU 32 sends communication data that includes a pre-air-conditioning command requiring that the air-conditioner be started up, to the air-conditioner ECU 33. If there is a demand to start up the engine, the remote operating ECU 32 sends communication data requiring that the engine be started up, to the engine ECU 34.

Incidentally, the terminal 70 and the outside tuner 31 are able to communicate with each other within a short distance of approximately several hundred meters. Alternatively, for example, the terminal 70 may connect to (i.e., establish a link with) a base station and communicate with the remote operating apparatus 60 via a predetermined server over a phone line.

If only the air-conditioner is to be turned on, the pre-air-conditioning command needs to be output only to the air-conditioner ECU 33. However, in this example embodiment, the pre-air-conditioning command is output from the remote operating ECU 32 or the air-conditioner ECU 33 to the antitheft ECU 20 as well.

When the antitheft ECU 20 receives the pre-air-conditioning command, it sets the pre-air-conditioning flag 45 to on. As a result, the antitheft device 50 is able to detect that the air-conditioner will be turned on or is operating while the security state is the armed state C.

Incidentally, when the air-conditioner ECU 33 turns on the air-conditioner, electromagnetic waves from the inverter or compressor may cause the amount of change in the radio waves detected by the intrusion sensor 13 to exceed the reference value. Also, when the air-conditioner is turned on and blows air, the blown air may cause the amount of change in the ultrasonic waves detected by the intrusion sensor 13 to exceed the reference value.

In this example embodiment, the antitheft device 50 is prohibited from erroneously activating as a result of a false detection by the intrusion sensor 13 by prohibiting the security state from shifting to the alarm activated state D even if the intrusion sensor 13 outputs an alarm command due to the air-conditioner turning on while the antitheft device 50 is in the armed state C. Also, according to another mode, when the air-conditioner is turned on while the antitheft device 50 is in the armed state C, erroneous activation of the antitheft device 50 as a result of a false detection by the intrusion sensor 13 is prohibited by reducing the sensitivity of the intrusion sensor 13.

The vehicle provided with the antitheft device 50 may be a vehicle that uses only an engine as the power source, a hybrid vehicle (including a plug-in hybrid vehicle), or an electric vehicle without an engine (including a plug-in electric vehicle). With hybrid vehicles and electric vehicles in particular, the air-conditioner is often on when the power source is stopped so the antitheft device 50 of this example embodiment is well suited to hybrid vehicles and electric vehicles.

(Control Routine of the Antitheft Device 50)

Figure 3:
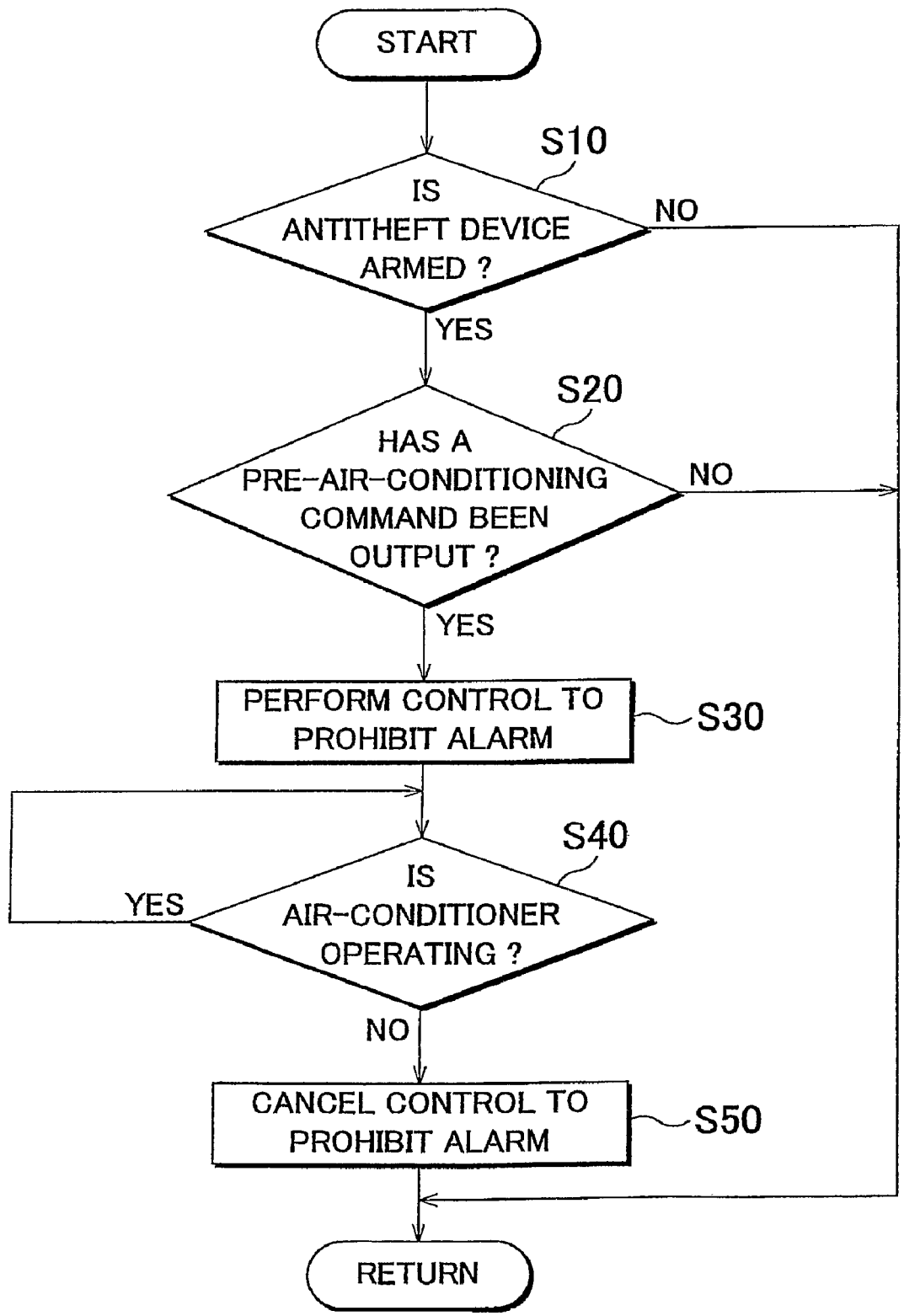
FIG. 3 is a flowchart illustrating a control routine of the antitheft device.

FIG. 3 is a flowchart illustrating a control routine of the antitheft device 50 that prevents erroneous activation of the antitheft device 50 by prohibiting a shift into the alarm activated state D. The routine in the flowchart is FIG. 3 starts when the antitheft device 50 shifts into the armed state C, for example.

The state transition controlling portion 41 determines whether the antitheft device 50 is in the armed state C (step S10). If the antitheft device 50 is not in the armed state C (i.e., No in step S10), this step (i.e., step S10) is repeated.

If the antitheft device 50 is in the armed state C, the determining portion 42 determines whether a pre-air-conditioning command has been output by referencing the pre-air-conditioning flag 45 (step S20). This pre-air-conditioning flag 45 automatically turns on when a pre-air-conditioning command is output.

If no pre-air-conditioning command has been output (i.e., No in step. S20), the antitheft device 50 remains in the armed state C without the transition prohibiting portion 44 prohibiting a shift into the alarm activated state D.

If, on the other hand, a pre-air-conditioning command has been output (i.e., Yes in step S20), the transition prohibiting portion 44 prohibits a shift into the alarm activated state D (step S30). As a result, even if the antitheft ECU 20 receives an alarm command from a tampering detection sensor 30, the state transition controlling portion 41 will not shift the antitheft device 50 into the alarm activated state D. Therefore, even if the air-conditioner is turned on in response to the pre-air-conditioning command, and as a result, the voltage fluctuates such that the change in the radio waves detected by the intrusion sensor 13 exceeds the reference value, or the air blown from the air-conditioner cause the change in the ultrasonic waves detected by the intrusion sensor 13 to exceed the reference value, the alarm device 16 will not activate erroneously. Incidentally, the alarm command may also be prohibited from being output by setting the sensitivity of the intrusion sensor 13 to zero, for example.

Continuing on, the determining portion 42 determines whether the air-conditioner is operating by referencing the pre-air-conditioning flag 45 (step S40). If the air-conditioner is operating (i.e., Yes in step S40), the intrusion sensor 13 may make a false detection so step S40 is repeated until pre-air-conditioning stops. That is, while the air-conditioner is operating, the transition prohibiting portion 44 keeps prohibiting a shift into the alarm activated state D.

The pre-air-conditioning is turned on regardless of whether the engine is started so the air-conditioner ECU 33 automatically turns off the air-conditioner when a predetermined period of time has passed after the air-conditioner turned on to perform pre-air-conditioning in order to prevent excessive draining of the battery 19. Also, the air-conditioner ECU 33 will also turn off the air-conditioner when the user starts the pre-air-conditioning and then stops it remotely without getting into the vehicle. When the air-conditioner ECU 33 turns off the air-conditioner, the air-conditioner ECU 33 outputs a signal indicating that pre-air-conditioning is off to the antitheft ECU 20. As a result, the antitheft ECU 20 turns off the pre-conditioning flag 45 in response to that signal.

The determining portion 42 repeatedly determines whether the air-conditioner is operating by referencing the pre-air-conditioning flag 45 at predetermined intervals of time. If the air-conditioner is off (i.e., No in step S40), the transition prohibiting portion 44 stops prohibiting the transition to the alarm activated state D (i.e., cancels the control to prohibit the transition to the alarm activated state D) (step S50). As a result, the security level can be restored.

According to the control routine shown in FIG. 3, a shift to the alarm activated state D is prohibited when the air-conditioner is turned on for pre-air-conditioning as well as while it is operating during pre-air-conditioning. Accordingly, erroneous activation of the antitheft device 50 can reliably be prevented.

(First Modified Example of the Control Routine of the Antitheft Device 50)

In FIG. 3, a shift to the alarm activated state D is prohibited when the air-conditioner is turned on for pre-air-conditioning as well as when it is operating during pre-air-conditioning. Alternatively, however, the alarm command may be prohibited from being output from only the intrusion sensor 13 by reducing the sensitivity of only the intrusion sensor 13, for example.

Figure 4:
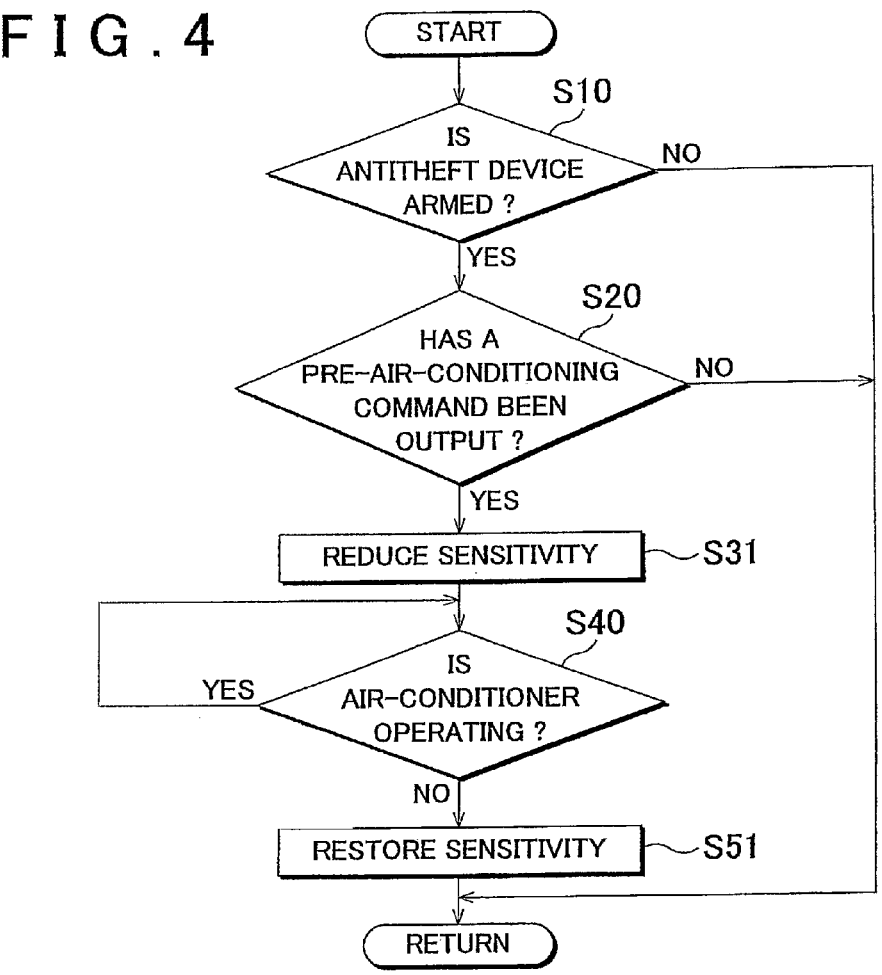
FIG. 4 is a flowchart illustrating another control routine of the antitheft device.

FIG. 4 is a flowchart illustrating a control routine of the antitheft device 50 that minimizes erroneous activation of the antitheft device 50 by reducing the sensitivity of the intrusion sensor 13. Incidentally, descriptions of steps in FIG. 4 that are the same as steps in FIG. 3 will be omitted. FIG. 4 differs from FIG. 3 in that the sensitivity of the intrusion sensor 13 is restricted in step S31, and the sensitivity of the intrusion sensor 13 is restored in step S51.

That is, when the pre-air-conditioning flag 45 is on, the sensitivity controlling portion 43 reduces the sensitivity of the intrusion sensor (step S31). Reducing the sensitivity refers to, for example, increasing the reference value for the ultrasonic or radio wave fluctuation, or increasing the frequency of the fluctuation that is equal to or great than a reference value required for an alarm command to be output so that the frequency is higher than the frequency before the sensitivity is reduced.

Even when the sensitivity is reduced in this way, the intrusion sensor 13 is still able to detect an intruder rummaging through the vehicle cabin and output an alarm command to the antitheft ECU 20. On the other hand, the sensitivity of the intrusion sensor 13 is reduced so fluctuations in the ultrasonic or radio waves produced by the operating air-conditioner are not detected as easily. As a result, security can be ensured while erroneous activation of the alarm device 16 can be minimized.

Also, when the pre-air-conditioning flag 45 turns off (i.e., No in step S40), the sensitivity controlling portion 43 restores the sensitivity of the intrusion sensor 13 (step S51). By restoring the sensitivity, the security level returns to its original level such that an intruder can be acutely detected.

(Second Modified Example of the Control Routine of the Antitheft Device 50)

Also, the sensitivity of the intrusion sensor 13 may also be variably controlled according to the combined operating states of the air-conditioner and the engine. For example, the sensitivity of the intrusion sensor 13 can be changed as follows. When both the engine and the air-conditioner are off, the sensor sensitivity is set to A (which is the highest sensitivity). When the engine is on and the air-conditioner is off, the sensor sensitivity is set to B. When the engine is off and the air-conditioner is on, the sensor sensitivity is set to C. When both the engine and the air-conditioner are on, the sensor sensitivity is set to D (which is the lowest sensitivity). The relationship among the sensor sensitivities A to D of the intrusion sensor 13 is as follows: A>B>C>D. Therefore, the security level can be set variably according to the operating states of the engine and the air-conditioner.

As described above, the antitheft device 50 of this example embodiment can be prevented from erroneously activating due to pre-air-conditioning by prohibiting a shift to the alarm activated state D when the air-conditioner is turned on or while it is operating, or limiting the sensitivity of the intrusion sensor 13.

Next, a second example embodiment of the invention will be described. In FIG. 4 of the first example embodiment, the sensitivity of the intrusion sensor 13 is simply reduced when the air-conditioner is turned on or while it is operating. However, it is conceivable that the operating amount of the air-conditioner may affect whether the intrusion sensor 13 makes a false detection. That is, a larger air-conditioner operating amount results in more air being blown by the air-conditioner, which in turn causes the ultrasonic waves to fluctuate more. Also, a larger air-conditioner operating amount increases the processing load, and as a result, electromagnetic waves are produced which increase the fluctuation in the radio waves detected by the intrusion sensor 13. Conversely, the intrusion sensor 13 is less likely to make a false detection when the operating amount of the air-conditioner low.

Here, the antitheft device 50 that variably sets the sensitivity of the intrusion sensor 13 according to the operating amount of the air-conditioner; according to the second example embodiment will be described.

Figure 5:
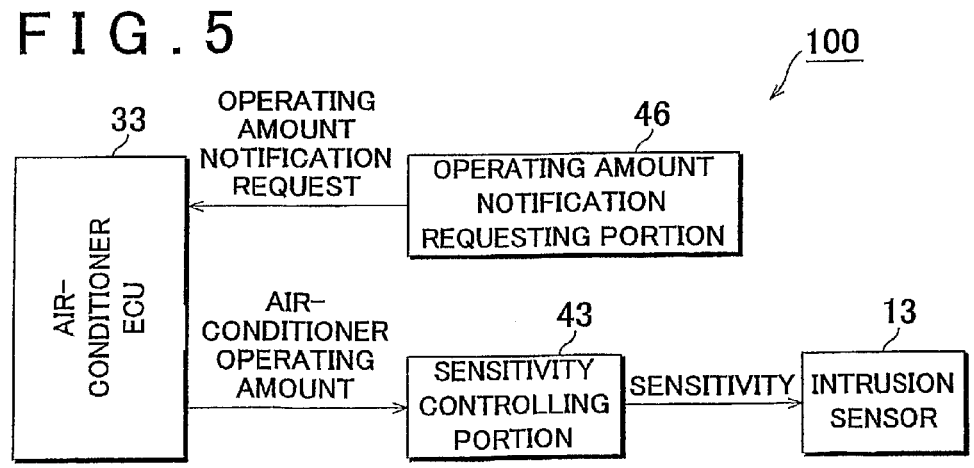
FIG. 5 is an example of a block diagram of an antitheft device that controls the sensitivity of an intrusion sensor based on the air-conditioner operating amount.

FIG. 5 is a block diagram of the antitheft security system 100 that controls the sensitivity of the intrusion sensor 13 according to the operating amount of the air-conditioner. The antitheft security system 100 in FIG. 5 has an operating amount notification requesting portion 46 that is realized by the CPU executing a program. This operating amount notification requesting portion 46 outputs a request for notification of the air-conditioner operating amount to the air-conditioner ECU 33 at predetermined intervals of time when the pre-air-conditioning flag 45 is on.

The air-conditioner ECU 33 computes signals from various temperature sensors 35 (i.e., inside air sensor, outside air sensor) inside and outside the vehicle cabin, and a signal from a sunload sensor that detects the amount of sunlight and the like into basic information with respect to the set temperature (the current air-conditioner setting) that the user set last, for example, and then determines the operating amount of the air-conditioner. The determined operating amount of the air-conditioner includes the speed of the blower motor that controls the air flow, the driving angle of the air mix damper, and the compressor capacity, and the like.

When the operating amount notification requesting portion 46 outputs a request for notification of the air-conditioner operating amount to the air-conditioner ECU 33, the air-conditioner ECU 33 notifies the antitheft ECU 20 of the determined air-conditioner operating amount. The air-conditioner operating amount includes a plurality of elements such as air flow. As a result, the sensitivity controlling portion 43 weights the plurality of elements and generates a single index that determines the air-conditioner operating amount.

The sensitivity controlling portion 43 references a pre-stored correspondence relationship between the sensitivity and the air-conditioner operating amount (this relationship is such that the sensitivity decreases as the air-conditioner operating amount increases), and controls the sensitivity of the intrusion sensor 13 to reduce the sensitivity as the air-conditioner operating amount increases (when the air-conditioner operating amount, is equal to or greater than a predetermined amount). Incidentally, the processing load of the sensitivity controlling portion 43 can be reduced by controlling the sensitivity using the air flow, in particular, from among the elements included in the air-conditioner operating amount.

It is not preferable to turn on the air-conditioner before decreasing the sensitivity of the intrusion sensor 13. Therefore, the air-conditioner may be turned on after a predetermined period of time has passed right before it is to be turned on, i.e., after an operation command is output to the air-conditioner. More specifically, the air-conditioner ECU 33 turns on the air-conditioner after waiting until a predetermined delay time has passed after receiving a pre-air-conditioning command. This delay time is a period of time that is sufficient, for the sensitivity controlling portion 43 to obtain the air-conditioner operating amount and set the sensitivity.

(Control Routine of the Antitheft Device 50 Based on the Air-Conditioner Operating Amount)

Figure 6:
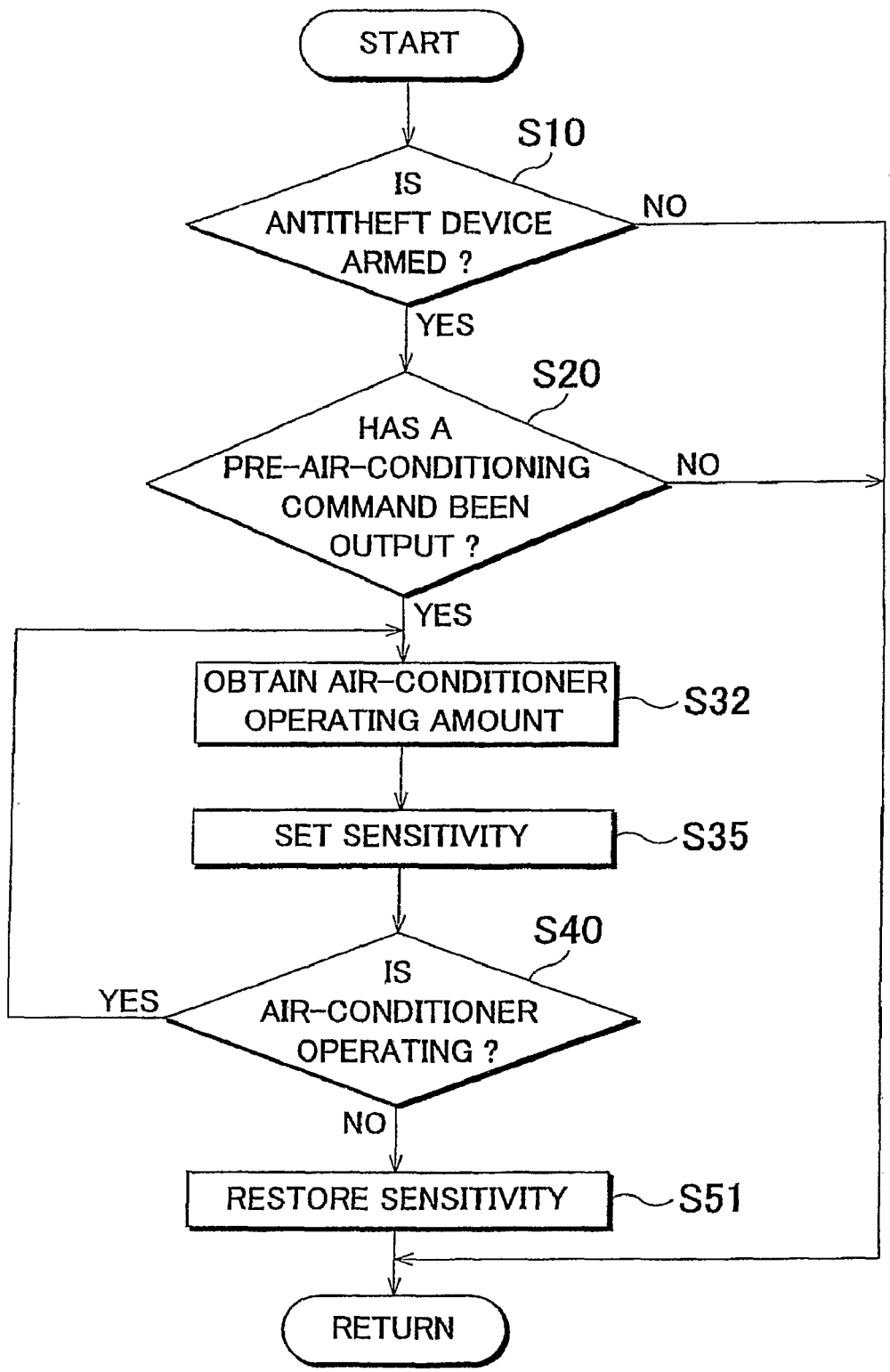
FIG. 6 is a flowchart illustrating a control routine of the antitheft device that controls the sensitivity of an intrusion sensor based on the air-conditioner operating amount.

FIG. 6 is a flowchart illustrating a control routine of the antitheft device 50 that controls the sensitivity of the intrusion sensor 13 based on the air-conditioner operating amount. Incidentally, steps in FIG. 6 that are the same as steps in FIG. 4 will be referred to by the same step numbers. The routine in the flowchart in FIG. 6 starts when the antitheft device 50 shifts to the armed state C, for example.

If the state transition controlling portion 41 determines in step S10 that the antitheft device 50 is not in the armed state C (i.e., No in step S10), this step (i.e., step S10) is repeated.

If the antitheft device 50 is in the armed state C, the determining portion 42 determines whether a pre-air-conditioning command has been output by referencing the pre-air-conditioning flag 45 (step S20). If no pre-air-conditioning command has been output (i.e., No in step S20), the antitheft device 50 remains as it is in the armed state C.

If, on the other hand, a pre-air-conditioning command has been output (i.e., Yes in step S20), the operating amount notification requesting portion 46 sends a request for notification of the air-conditioner operating amount to the air-conditioner ECU 33, and in response, the air-conditioner ECU 33 outputs a signal indicative of the air-conditioner operating amount to the sensitivity controlling portion 43 (i.e., the sensitivity controlling portion 43 obtains the air-conditioner operating amount from the air-conditioner ECU 33) (step S32).

Then, the sensitivity controlling portion 43 determines the sensitivity of the intrusion sensor 13 based on the air-conditioner operating amount or the air flow of the blower motor included in the air-conditioner operating amount, and then sets the sensitivity of the intrusion sensor 13 (step S35).

Because the sensitivity is set according to the air-conditioner operating amount, the alarm device 16 will not erroneously activate even if the increased air-conditioner operating amount causes the voltage to greatly fluctuate such that the change in radio waves detected by the intrusion sensor 13 exceeds the reference value, or causes air to be forcefully blown from the air-conditioner such that the change in the ultrasonic waves detected by the intrusion sensor 13 exceeds the reference value. Also, when the operating amount of the air-conditioner is small, the sensitivity of the intrusion sensor 13 is high so the sensitivity can be kept at a level that will detect an intruder.

Next, the determining portion 42 determines whether the air-conditioner is operating by referencing the pre-air-conditioning flag 45 (step S40). If the air-conditioner is operating (i.e., Yes in step S40), there is a possibility that the intrusion sensor 13 may make a false detection so step S40 is repeated until the air-conditioner is turned off.

Incidentally, while the air-conditioner is operating, the operating amount notification requesting portion 46 sends a request for notification of the air-conditioner operating amount to the air-conditioner ECU 33 at predetermined intervals of time. The sensitivity controlling portion 43 then resets the sensitivity based on the notified air-conditioner operating amount. As a result, even if air-conditioning by the air-conditioner progresses (i.e., the cabin temperature changes), and as a result, the air-conditioner operating amount changes, the sensitivity of the intrusion sensor 13 can be changed according to the air-conditioner operating amount so the air-conditioner operating amount and the sensitivity of the intrusion sensor 13 can constantly be optimized.

Then, when the air-conditioner ECU 33 turns the air-conditioner off and outputs a signal indicating that pre-air-conditioning has stopped to the antitheft ECU 20, the antitheft ECU 20 turns off the pre-air-conditioning flag 45 based on that signal.

The determining portion 42 repeatedly determines whether the air-conditioner is operating by referencing the pre-air-conditioning flag 45 and when the air-conditioner is turned off (i.e., No in step S40), the sensitivity controlling portion 43 restores the sensitivity of the intrusion sensor 13 (step S51).

According to the control routine in FIG. 6, the sensitivity of the intrusion sensor 13 is set according to the air-conditioner operating amount. Therefore, the reduction in sensitivity to prevent false detection is kept to the minimum, thereby making it possible to minimize erroneous activation of the antitheft device 50 due to pre-air-conditioning.

Incidentally, an alarm command may be prohibited from being output by, for example, setting the sensitivity of the intrusion sensor 13 to zero when the air-conditioner operating amount is equal to or greater than a predetermined amount instead of variably changing the sensitivity according to the air-conditioner operating amount.

As described above, the air-conditioner operating amount is determined by the set temperature and the temperatures inside and outside of the cabin. Accordingly, even if the actual air-conditioner operating amount is not obtained from the air-conditioner ECU 33, the antitheft device 50 can estimate the air-conditioner operating amount if the set temperature and the temperatures inside and outside of the cabin are known. Accordingly, the antitheft device 50 that sets the sensitivity of the intrusion sensor 13 based on the ambient temperature that determines the air-conditioner operating amount will be described.

FIG. 7A is a block diagram of the antitheft security system 100 that controls the sensitivity of the intrusion sensor 13 by estimating the air-conditioner operating amount. The antitheft security system 100 shown in FIG. 7A has an air-conditioner operating amount estimating portion 47 that is realized by the CPU executing a program. When the pre-air-conditioning flag 45 is on, the air-conditioner operating amount estimating portion 47 obtains the temperature to which the air-conditioner is set at the time the ignition is turned off (i.e., the set temperature at that time), from the air-conditioner ECU 33 and obtains the current ambient temperature from one of the temperature sensors 35. The air-conditioner operating amount estimating portion 47 then estimates the air-conditioner operating amount:

The air-conditioner operating amount estimating portion 47 can estimate the air-conditioner operating amount from the set temperature and the inside and outside temperatures using a similar calculation method as used by the air-conditioner ECU 33 or a known calculation method. The sensitivity controlling portion 43 then determines the sensitivity and sets the intrusion sensor 13 to it, just as in FIG. 5, based on the estimated air-conditioner operating amount.

Incidentally, the set temperature that is set by the user is determined to some extent for each season (e.g., 20° C. in winter, 25° C. in summer). Therefore, regardless of the actual set temperature, the air-conditioner operating amount may also be estimated from this typical set temperature and the inside and outside temperatures. Also, when a typical set temperature is used, the calculation for estimating the air-conditioner operating amount can be simplified by selecting only the cabin temperature (i.e., the inside temperature), for example, which is the temperature that most affects the air-conditioner operating amount, from among the outside temperature and the inside temperature.

Considering that the air-conditioner operating amount relies largely on the ambient temperature, the sensitivity of the intrusion sensor 13 can be determined from only the ambient temperature, without estimating the air-conditioner operating amount. FIG. 7B is a block diagram of the antitheft security system 100 that controls the sensitivity of the intrusion sensor 13 according to the ambient temperature. Here, the cabin temperature, i.e., the inside temperature, that is detected by an inside air sensor which is one of the temperature sensors 35 can be used as the ambient temperature. For example, the sensitivity of the intrusion sensor 13 can be determined using the temperature difference between the set temperature of the air-conditioner and the cabin temperature, as shown by a temperature difference table of the sensitivity controlling portion 43 in FIG. 7B.

The sensitivity controlling portion 43 stores a table with different sensitivities corresponding to different temperature differences between the set temperature or typical set temperature and the ambient temperature, and is thus able to determine the sensitivity using the ambient temperature and the set temperature or the typical set temperature. The table in FIG. 7B shows five sensitivity levels (a higher numerical value indicates greater sensitivity) for the armed state C, for example. The corresponding sensitivity decreases as the absolute value of the temperature difference increases.

Therefore, with the structure shown in FIG. 7B, the sensitivity can be variably controlled based on the ambient temperature without estimating the air-conditioner operating amount. When the typical set temperature is used, the sensitivity of the intrusion sensor 13 can be determined from only a measurement value of one of the temperature sensors 35, such as the outside or inside temperature. This reduces the processing load on the sensitivity controlling portion 43.

Figure 8:
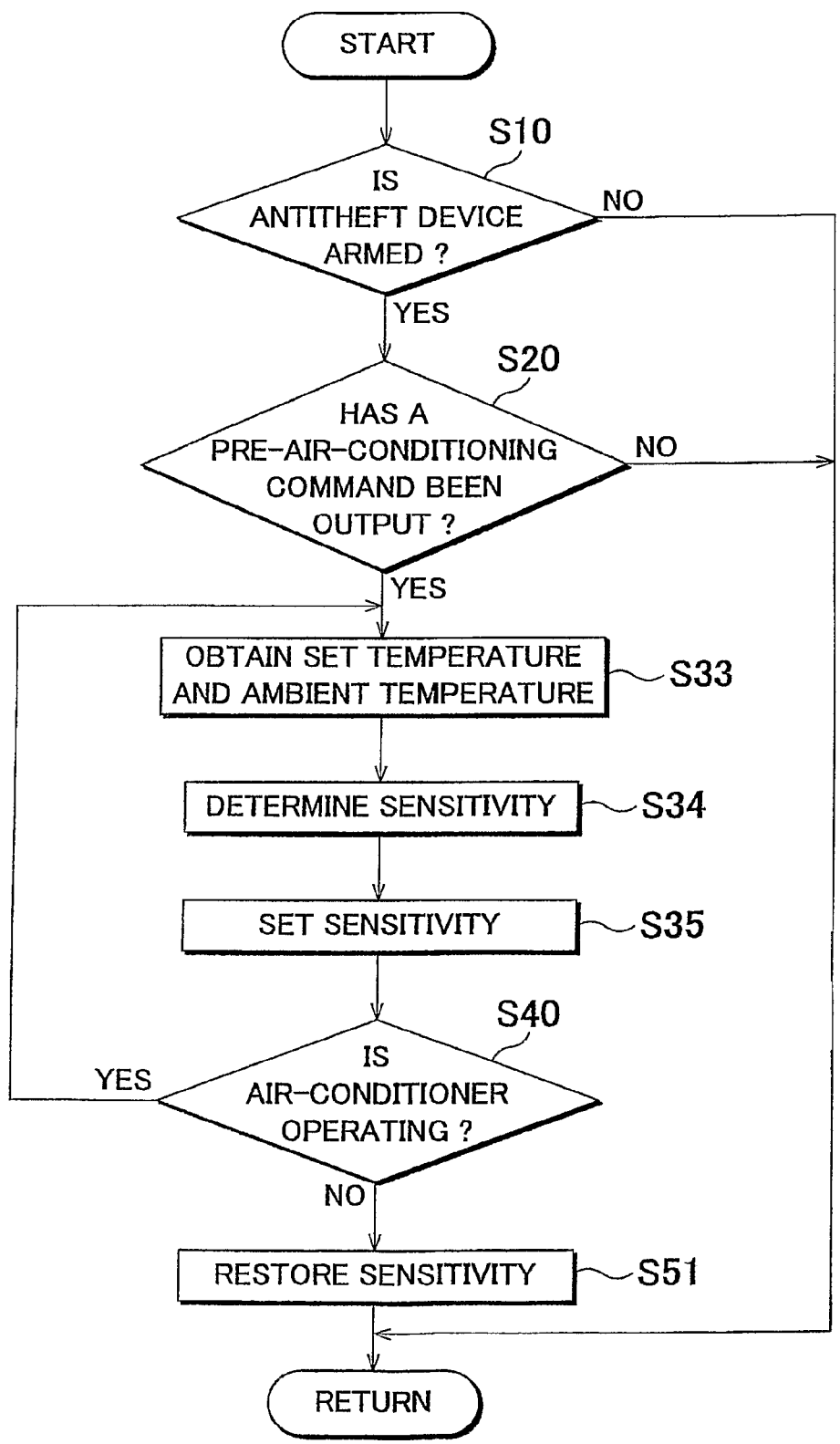
FIG. 8 is an example of a flowchart illustrating a control routine of the antitheft device that controls the sensitivity of an intrusion sensor based on the ambient temperature.

FIG. 8 is a flowchart illustrating a control routine of the antitheft device 50 that controls the sensitivity of the intrusion sensor 13 based on the ambient temperature. The control routine of FIG. 8 is based on the block diagram shown in FIG. 7B. Incidentally, steps in FIG. 8 that are the same as steps in FIG. 6 will be denoted by the same step numbers. The routine in the flowchart in FIG. 8 starts when the antitheft device 50 shifts to the armed state C, for example.

If the state transition controlling portion 41 determines in step S10 that the antitheft device 50 is not in the armed state C (i.e., No in step S10), this step (i.e., step S10) is repeated.

If the antitheft device 50 is in the armed state C, the determining portion 42 determines whether a pre-air-conditioning command has been output by referencing the pre-air-conditioning flag 45 (step S20). If no pre-air-conditioning command has been Output (i.e., NO in step S20), the antitheft device 50 remains as it is in the armed state C.

If, on the other hand, a pre-air-conditioning command has been, output (i.e., Yes in step S20), the sensitivity controlling portion 43 obtains the set temperature and the ambient temperature (step S33). The set temperature is obtained from the air-conditioner ECU 33 and the ambient temperature is obtained from an ECU (such as the engine ECU 34) that controls the temperature sensor 35 that detects the ambient temperature.

Once the set temperature and the ambient temperature are obtained, the sensitivity controlling portion 43 determines the sensitivity of the intrusion sensor 13 according to the temperature difference between the ambient temperature and the set temperature (step S34), and sets the intrusion sensor 13 to that sensitivity (step S35).

Because the sensitivity is set based on the temperature difference between the set temperature and the ambient temperature, and there is a correlation between this temperature difference and the air-conditioner operating amount, the alarm device 16 will not erroneously activate even if the increased air-conditioner operating amount causes the voltage to greatly fluctuate such that the change in radio waves detected by the intrusion sensor 13 exceeds the reference value, or causes air to be forcefully blown from the air-conditioner such that the change in the ultrasonic waves detected by the intrusion sensor 13 exceeds the reference value. Also, when the temperature difference is small, the sensitivity of the intrusion, sensor 13 is high so the sensitivity can be kept at a level that enables an intruder to be detected.

Next, the determining portion 42 determines whether the air-conditioner is operating by referencing the pre-air-conditioning flag 45 (step S40). If the air-conditioner is operating (i.e., Yes in step S40), the intrusion sensor 13 may make a false detection so step S40 is repeated until pre-air-conditioning stops.

Incidentally, while the air-conditioner is operating, the sensitivity controlling portion 43 obtains the set temperature and the ambient temperature at predetermined intervals of time. Therefore, even if the cabin temperature changes while the air-conditioner is operating, the relationship between the temperature difference and the sensitivity of the intrusion sensor 13 can constantly be optimized.

Then when the air-conditioner ECU 33 turns off the air-conditioner and outputs a signal indicating that pre-air-conditioning is off to the antitheft ECU 20, the antitheft ECU 20 turns off the pre-conditioning flag 45 in response to that signal.

The determining portion 42 repeatedly determines whether the air-conditioner is operating by referencing the pre-air-conditioning 45, and when the air-conditioner is turned off (i.e., No in step S40), the sensitivity controlling portion 43 restores the sensitivity of the intrusion sensor 13 (step S51).

According to the control routine in FIG. 8, the sensitivity of the intrusion sensor 13 is set according to both the set temperature and the ambient temperature, or just the ambient temperature. Therefore, the reduction in sensitivity to prevent false detection is kept to the minimum, thereby making it possible to prevent erroneous activation of the antitheft device 50 due to pre-air-conditioning.

Incidentally, an alarm command may be prohibited from being output by, for example, setting the sensitivity of the intrusion sensor 13 to zero when the temperature difference is equal to or greater than a predetermined difference instead of variably changing the sensitivity according to the temperature difference.

A third example embodiment of the invention will now be described. A hybrid vehicle or the like is provided with a plug for charging the battery. This plug can be plugged into an outlet to charge the battery while the vehicle is parked. While charging the battery when the vehicle is parked, the antitheft device 50 is in the armed state C so it will shift into the alarm activated state D if the tampering detection sensor 30 detects tampering. Moreover, if an attempt is made to illicitly move the vehicle while it is parked, the plug will become unplugged from the outlet. Accordingly, an unplugged state detecting portion will detect that the charging plug is unplugged and the antitheft device 50 will shift into the alarm activated state D, thus improving security.

Therefore, the unplugged state detecting portion is one mode of the tampering sensor 30. If the unplugged state detecting portion is applied to the first or second example embodiment, the antitheft device 50 will be prohibited from shifting into the alarm activated state D when a pre-air-conditioning command is output while charging the battery using the plug.

The pre-air-conditioning command is sent by the driver when he or she is relatively near the vehicle. Therefore, even if an unplugged state is detected and the alarm starts to go off, the driver is able to quickly shift the antitheft device 50 into the disarmed state A (i.e., disarm the antitheft device 50) by unlocking a door using a legitimate key. However, even if a pre-air-conditioning command is received, it is preferable not to prohibit a shift into the alarm activated state D if the unplugged state detecting portion detects that the charging plug is unplugged. This enables security to be kept as high as possible. Also, if someone possesses a legitimate electronic key (such as a Smart Key (registered trademark), it can be confirmed by mutual communication with the vehicle so the antitheft device 50 can shift into the disarmed state A.

Figure 9:
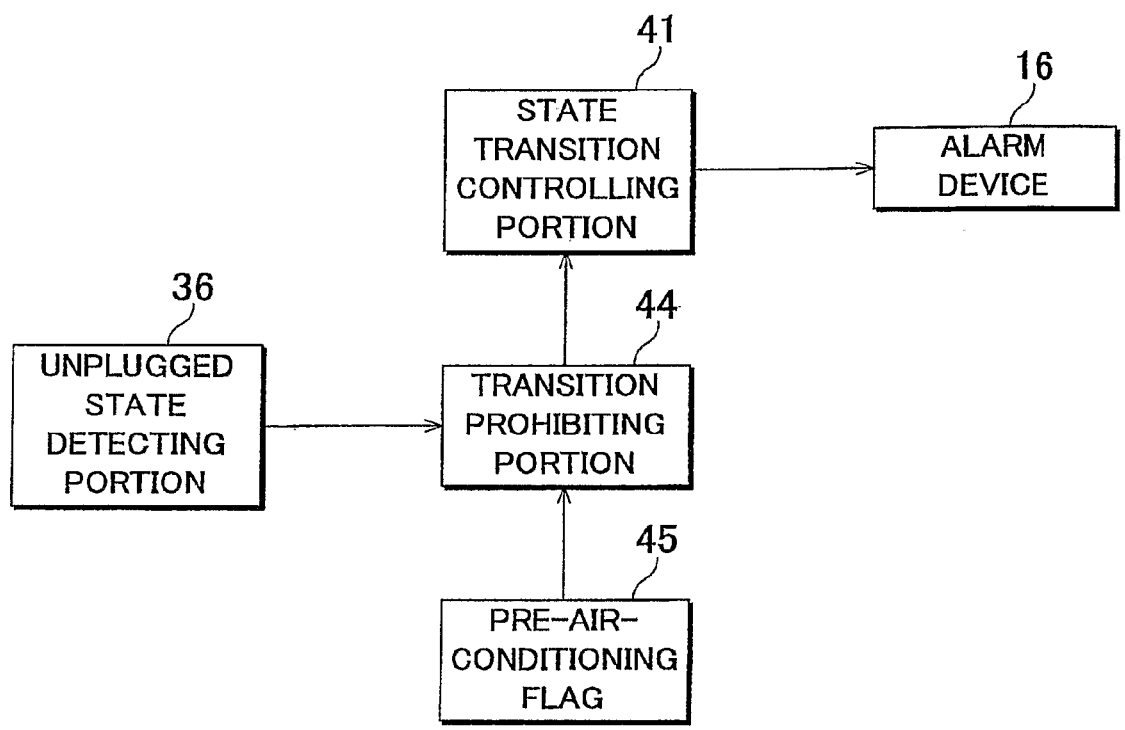
FIG. 9 is an example of a block diagram of an antitheft security system that does not prohibit a transition into an alarm activated state D when an unplugged state is detected.

FIG. 9 is a block diagram of the antitheft security system 100 that does not prohibit a shift into the alarm activated state D when an unplugged state is detected. The transition prohibiting portion 44 prohibits the state transition controlling portion 41 from shifting to the alarm activated state D when the pre-air-conditioning flag 45 is on. However, the transition prohibiting portion 44 stops prohibiting (i.e., cancels the control to prohibit), or does not prohibit, the state transition controlling portion 41 from shifting to the alarm activated state D when the unplugged state detecting portion 36 detects an unplugged state. Accordingly, when an unplugged state is detected, the alarm device 16 will activate if the intrusion sensor 13 makes a false detection due to the pre-air-conditioning command.

FIG. 10 is a flowchart illustrating a control routine of the antitheft device 50 that detects the unplugged state. Incidentally, steps in FIG. 10 that are the same as those in FIG. 3 will be denoted by the same step numbers and descriptions of those steps will be omitted.

In FIG. 10, when the determining portion 42 determines that a pre-air-conditioning command has been output by referencing the pre-air-conditioning flag 45 (i.e.; Yes in step S20), the unplugged state detecting portion 36 detects whether the plug is unplugged (step S36).

If the unplugged state detecting portion 36 detects that the plug is unplugged (i.e., Yes in step S36), the process proceeds on to step S50, where the transition prohibiting portion 44 stops prohibiting (i.e., cancels the control to prohibit) a shift into the alarm activated state D (step S50). As a result, the security level can be restored.

According to this example embodiment, the reduction in security can be kept to a minimum even if a pre-air-conditioning command is output.

As described above, with the antitheft device 50 of this example embodiment, erroneous activation can be prevented while minimizing a reduction in security even when the air-conditioner of a vehicle in which the antitheft device 50 is in the aimed state C is turned on remotely.

Also, while the air-conditioner of the vehicle is operating, erroneous activation can be prevented while minimizing a reduction in security by the same method even if the antitheft device 50 is placed in the armed state C due to the power source of the vehicle being stopped and the user leaving the vehicle.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various combinations and configurations, other combinations and configurations, including more, less or only a single element, are also within the scope of the appended claims.

The invention claimed is:

1. An antitheft device for a vehicle comprising:
   an antitheft portion that activates in connection with tampering with the vehicle;
   an air-conditioning unit operation determining portion that determines whether an air-conditioning unit is about to be operated or is operating; and
   a restricting portion which, when it is determined by the air-conditioning unit operation determining portion that the air-conditioning unit is about to be operated or is operating, performs control to prohibit or restrict activation of the antitheft portion.

2. The antitheft device according to claim 1, further comprising:
a tampering detection portion that detects tampering,
wherein the restricting portion variably sets the sensitivity of the tampering detection portion based on the operating amount of the air-conditioning unit.

3. The antitheft device according to claim 1, wherein the restricting portion reduces the sensitivity of a function of the tampering detection portion, which may make a false detection due to operation of the air-conditioning unit.

4. The antitheft device according to claim 1, further comprising:
a temperature detecting portion that detects the ambient temperature in the vehicle,
wherein the restricting portion performs control to prohibit or restrict activation of the antitheft portion according to the ambient temperature detected by the temperature detecting portion.

5. The antitheft device according to claim 4, wherein the ambient temperature is the temperature inside a cabin of the vehicle, which is detected by the temperature detecting portion.

6. The antitheft device according to claim 4, wherein the operating amount of the air-conditioning unit is estimated based on a difference between the ambient temperature and a predetermined temperature.

7. The antitheft device according to claim 1, further comprising:
a tampering detection portion that detects tampering; and
a temperature detecting portion that detects the ambient temperature in the vehicle,
wherein the restricting portion variably sets the sensitivity of the tampering detection portion based on the ambient temperature detected by the ambient temperature detecting portion.

8. The antitheft device according to claim 1, further comprising:
an unplugged state detecting portion that detects when a plug used for charging is unplugged,
wherein when the unplugged state detecting portion detects that the plug is unplugged, the control to prohibit or restrict activation of the antitheft portion by the restricting portion is canceled.

9. The antitheft device according to claim 1, wherein the air-conditioning unit operation determining portion determines that the air-conditioning unit is about to be operated, between when an operation command is output to the air-conditioning unit and when the air-conditioning unit starts operating.

10. The antitheft device according to claim 9, wherein the operation command to the air-conditioning unit is output by a remote operating device provided in the vehicle.

11. The antitheft device according to claim 1, wherein when all of the doors of the vehicle are unlocked, the restricting portion performs the control to prohibit or restrict activation of the antitheft portion.

12. The antitheft device according to claim 1, wherein when a power source of the vehicle is stopped, the restricting portion performs the control to prohibit or restrict activation of the antitheft portion.

13. The antitheft device according to claim 1, wherein the restricting portion performs the control to prohibit or restrict activation of the antitheft portion when the operating amount of the air-conditioning unit is equal to or greater than a predetermined amount.

14. An electronic control unit comprising:
a tampering detection portion that detects tampering with a vehicle;
an alarm device that activates according to the detection results of the tampering detection portion;
an air-conditioning unit operation determining portion that determines whether an air-conditioning unit mounted in the vehicle is receiving an operation command or is operating; and
a restricting portion that performs control to prohibit or restrict activation of the alarm device when it is determined by the air-conditioning unit operation determining portion that the air-conditioning unit is receiving an operation command or is operating.

15. An antitheft security system for a vehicle, comprising:
a tampering detection portion that detects tampering with a vehicle;
a remote operating apparatus that remotely operates an air-conditioning unit mounted in the vehicle;
an air-conditioning unit operation determining portion that determines whether the air-conditioning unit is receiving an operation command or is operating; and
a restricting portion that performs control to prohibit or restrict activation of the antitheft security system when it is determined by the air-conditioning unit operation determining portion that the air-conditioning unit is receiving an operation command or is operating.

16. An antitheft method for a vehicle using an antitheft device of a vehicle provided with an air-conditioning unit, comprising:
detecting tampering with the vehicle;
determining whether the air-conditioning unit is receiving an operation command or is operating; and
prohibiting or restricting activation of the antitheft device when it is determined that the air-conditioning unit is receiving an operation command or is operating.

* * * * *